United States Patent [19]

Sonnberg et al.

[11] 3,961,527

[45] June 8, 1976

[54] SYSTEM FOR MEASURING THE FLOW AND RECORDING QUANTITIES OF LIQUID

[75] Inventors: Joachim Sonnberg; Ulrich Sanden, both of Hildesheim, Germany

[73] Assignee: Diessel GmbH & Co.

[22] Filed: Mar. 18, 1974

[21] Appl. No.: 451,961

Related U.S. Application Data

[63] Continuation-in-part of Ser. No. 193,283, Oct. 28, 1971, abandoned.

[30] Foreign Application Priority Data

Nov. 19, 1970 Germany............................ 2056854

[52] U.S. Cl. ............................ 73/194 R; 346/33 M; 346/51
[51] Int. Cl.² .......................................... G01F 1/00
[58] Field of Search.......... 73/194 R, 194 M, 194 E, 73/229, 231 R, 231 M; 222/23; 346/14 MR, 33 M, 50, 51, 74 M

[56] References Cited

UNITED STATES PATENTS

| | | | |
|---|---|---|---|
| 3,059,238 | 10/1962 | Quinn | 346/50 X |
| 3,230,767 | 1/1966 | Heigl et al. | 73/229 X |
| 3,258,692 | 6/1966 | Jacomini et al. | 346/34 X |
| 3,419,883 | 12/1968 | Chapsky | 346/14 MR |
| 3,430,256 | 2/1969 | Goodman | 346/34 X |
| 3,678,257 | 7/1972 | Lilley et al. | 73/194 R |

*Primary Examiner*—Richard C. Queisser
*Assistant Examiner*—John P. Beauchamp
*Attorney, Agent, or Firm*—Gilbert L. Wells

[57] ABSTRACT

A flow measurement system wherein liquid to be measured is conducted through a volumeter having a pulse generator, the pulses of the volumeter are applied to an electronic counter, the output values of the counter are stored on a magnetic tape and the stored values are processed in a data processing system.

12 Claims, 3 Drawing Figures

SYSTEM FOR MEASURING THE FLOW AND RECORDING QUANTITIES OF LIQUID

CROSS REFERENCES TO RELATED APPLICATIONS

The disclosure of assignee's copending application Ser. No. 163,359, filed July 16, 1971, now Pat. No. 3,839,909, and entitled "Process and Apparatus for Determining Weight per Unit Volume of Liquids of Variable Density" is incorporated herein.

The present application is a continuation-in-part of application Ser. No. 193,283, filed Oct. 28, 1971 and now abandoned.

BACKGROUND OF THE INVENTION

The field of the invention is flow measurement systems. In the present invention the flow of liquids, particularly milk, is measured and recorded wherein liquid to be measured is conducted through a volumeter having a pulse generator and the pulses of the volumeter are applied to an electronic counter.

The state of the art may be ascertained by reference to U.S. Pat. Nos. 3,230,767 of Heigl et al; 3,258,692 of Jacomini et al; and 3,430,256 of Goodman.

In the prior art systems of this type, the values picked up by the electronic counter are fed to a tape perforator, the punched tapes then, in turn, are evaluated for the purpose of accounting.

These prior art systems have the disadvantage that a separate punched-tape reader is required for the evaluation of the punched tapes and this evaluation proper takes place comparatively slowly. Accordingly, the further processing of data supplied by the volumeter in a data processing machine is a difficulty of the prior art procedures.

SUMMARY OF THE INVENTION

Having in mind the limitations of the prior art, it is an object of the present invention to provide a flow measurement system which makes it possible to effect a direct and rapid evaluation of the counting results of a volumeter for the purpose of accounting for variable quantities and varied suppliers and the like.

This object is achieved, according to the present invention, by providing that the output values of the electronic counter are stored via a control device by means of a magnetic tape unit, and these stored data are further processed in a data processing machine.

By means of this system, the object is attained whereby individual magnetic tapes on which the registered data are recorded are fed directly to the data processing unit, which latter makes the appropriate account clearings available without detours and time loss. Besides, the process of this invention ensures that falsifications, alterations, and errors with respect to the recorded data are extensively excluded.

In an advantageous manner, it is furthermore possible to feed into the control unit additional constant values, serving for accounting purposes, such as measuring point number, date, and/or the number of the supplier. These data fed and recorded in this manner prior to the actual counting procedure exclude any possibility of error regarding the association of the recorded counting data.

The system of the present invention accordingly has a magnetic tape unit which is connected, via a control mechanism, to the output of the electronic counter and furthermore, input units for the recording of constant values are connected to the control mechanism.

Advantageously, the outputs of the electronic counter are connected to the control unit via a shift register and a keyboard for the feeding of constant values, such as the number of a supplier, or the like, is additionally connected to the shift register.

Thus, with the use of this system, the number of the supplier is closely correlated with the counting data, so that mistakes and erroneous interchange of data are impossible, especially when the counting procedure is blocked when the supplier's number has not as yet been fed.

Additional constant values, such as the date, the number of the vehicle or the number of the measuring point, or the like, are fed into the control unit via coding switches.

In order to prevent flow measurements when the last-mentioned data have not yet been fed, the coding switches are connected to a blocking device which permits measurement of the flow only after the constant data associated with the coding switches have been put in and registered. An advantageous arrangement in this connection is provided by effecting that, for the purpose of pulse counting, the blocking device of the coding switches releases the starting switch of the pump disposed in the flow pipe and/or the starting switch of the control mechanism and/or of the magnetic tape unit thereof, after the constant values have been recorded for the purpose of metering the impulses. The pump and the control mechanism are thus actuable together. By providing this dependency of switching on the pump only after the required constant data have been fed, it is ensured that a measurement is effectively prevented even when those data, which for example, must be put in only once a day, are neglected to be fed.

In order to prevent, in the above-discussed manner, a counting and/or recording procedure in the case where constant values must be fed anew for each measurement are missing, for example the number of the supplier, a second blocking device is provided and this is connected to the keyboard for feeding the supplier's number and blocking the counting step and/or the magnetic tape recording step when the supplier's number has not been put in.

An additional safeguard against erroneous recording results by providing that the magnetic tape unit can be switched on by actuating the crank handle of the volumeter for the purpose of recording the counter data. To this end, an additional energizing contact for the magnetic tape unit is ranged at the crank handle of the volumeter print-out device. Advantageously, a third blocking device is disposed between the pulse generator of the volumeter and the electronic counter, so that the counted data cannot be altered during the recording step and the recording thus cannot be falsified. This third blocking unit severs the pulse input of the electronic counter during the recording step. A particularly simple construction is obtained by making the third blocking device operable together with the switching on of the magnetic tape unit, i.e., for example, by the contact at the crank handle of the printout device. However, for purposes of such common energization, it is also possible to provide an additional pushbutton on a separate control panel.

The operation of the apparatus of the present invention is facilitated by the providing of optical and/or acoustical signal generators, associated with the individual components, for indicating the respective operating conditions. It is advantageous, in this connection, to provide that the signal generator for indicating the condition "ready for counting" is a blinker lamp. This blinker lamp flashes when the system is ready for counting, but the supplier's number has not yet been put in, and this lamp is lit continuously after the supplier's number has been introduced. In this way, the operator receives an optical signal when the input of the supplier's number is forgotten. The signaling device for indicating the condition "ready for counting" can, however, also be a horn which is sounded when the constant data have not been put in, or have been fed only insufficiently. This horn can also be switched in such a manner that it is sounded also when those values which must be put in only once a day, such as date and the number of the vehicle or the measuring point number, have not yet been fed.

The further processing of the recorded measuring values by a data processing machine for the purpose of accounting is considerably facilitated by providing the magnetic tape unit, in a conventional manner, with exchangeable cassettes, since, in this case, it is merely necessary to introduce the exchangeable cassettes into the data processing machine.

BRIEF DESCRIPTION OF THE DRAWINGS

The invention will be explained in greater detail below with reference to an embodiment shown in the drawings.

DESCRIPTION OF THE PREFERRED EMBODIMENT

Figure 1:
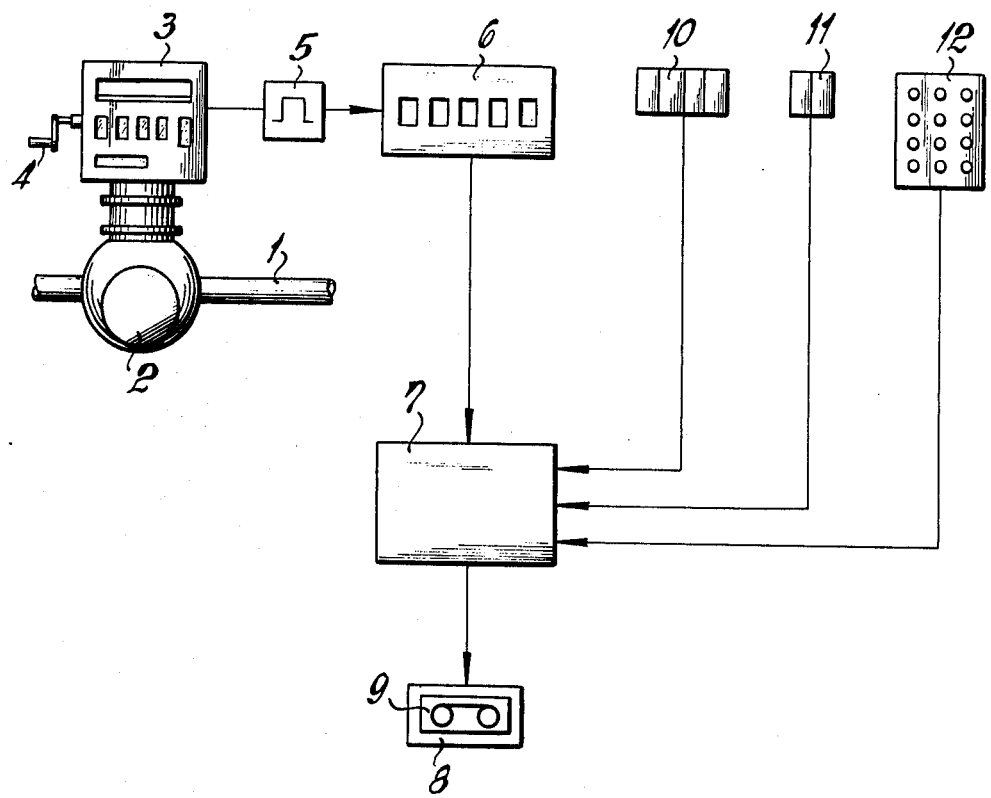
FIG. 1 shows, in a block circuit diagram, an embodiment of the apparatus for conducting the process of this invention.

According to FIG. 1, a volumeter 2 is disposed in a pipeline 1. This volumeter is provided, in a conventional manner, with a printer 3 with crank handle 4 and a pulse generator 5. The pulses of the pulse generator, for example one pulse per 0.1 liter, or one pulse per liter, are fed to an electronic counter 6. The output values of the electronic counter 6 are stored, via a control device 7, by means of a magnetic tape unit 8. The magnetic tape unit 8 has exchangeable magnetic tape cassettes 9 which can be introduced into a data processing unit, so that the data recorded on the magnetic tape cassettes 9 can be evaluated for purposes of accounting in any desired data processing equipment not connected with the above system.

Additional constant data is fed into the control mechanism 7, for which purpose, for example, two coding switches 10 and 11, with the corresponding indicating devices, are provided. The coding switches 10 and 11 serve for the input of those values which need be fed only once a day. Additional values which change during a particular day, such as, for example, the supplier's number, or the like, are put into the control device 7 by means of a keyboard 12.

The system of this invention is constructed in such a manner that it consists of two modular units which are readily accommodated on tank trucks, wherein the tank trucks detect, by means of the arrangement of this invention, the respective amounts which are loaded, as well as the quantities which are discharged. These two modules consist of the registering module proper, i.e., parts 6 through 11, and of an operating module, i.e. part 12. The registering module is preferably located in the driver's cab, and the operating module is positioned in the pump chamber.

Figure 2:
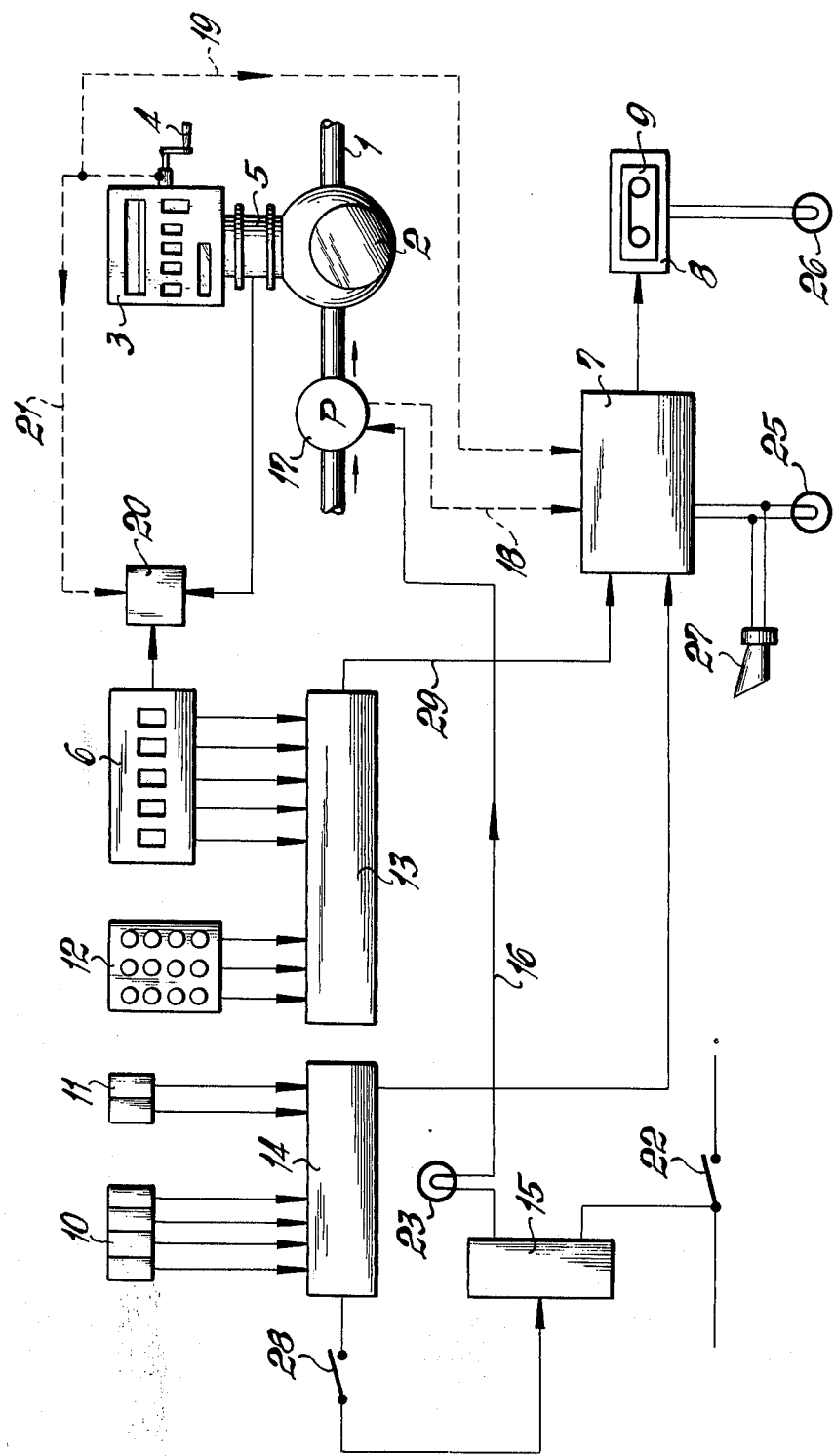
FIG. 2 shows, in a block circuit diagram, the arrangement of FIG. 1 in detail.

FIG. 2 shows, in a block circuit diagram, the arrangement according to FIG. 1 in detail. As can be seen from FIG. 2, the outputs of the electronic counter 6 are connected, via a shift register 13, to the control mechanism 7. For purposes of correlation, the keyboard 12 is likewise connected in order to feed those constant values which change frequently, such as the supplier's number, or the like.

The two coding switches, with indicator, 10 and 11 for the date and for the number of the vehicle or the number of the measuring point, respectively, are connected to a common input unit 14 which, in turn, is connected to the control device 7. A further input unit 15 with switch 28 is connected in front of the coding switches 10 and 11, and this input unit contains a blocking device which permits the flow measurement only after the constant values associated with the coding switches have been put in and recorded. For this purpose, the blocking device in the input unit 15 is connected, via the schematically indicated line 16, with the starting switch of the pump 17 disposed in the flow conduit 1, so that only after the current date and the numbers of the vehicle and the measuring point have been put in and recorded is the pump released for the flow measurement. The pump 17, in turn, is connected to the control device 7 via the line 18, shown in dashed lines, so that only after the pump 17 has been switched on, the control device 7 and thus also the magnetic tape unit 8 are actuated. The pump and the control device are thus switched on together.

A second blocking device in control 7 is provided which is connected with the keyboard 12 for feeding the supplier's number and this blocks the counting process and/or the magnetic tape recording procedure when the supplier's number has not been fed.

A contact at the crank handle 4 of the printer 3 of the volumeter 2 is connected, via the dashed line 19, with the control device 7 and thus with the magnetic tape unit 8, so that the recording proper is initiated, after the devices 7 and 8 have first been switched on by the pump connection, by the actuation of the hand crank 4. In order to prevent, during the recording, the input of additional pulses from the pulse generator 5 to the electronic counter 6, a third blocking device 20 is connected between the pulse generator 5 of the volumeter 2 and the electronic counter 6, and this blocking device interrupts the pulse input to the electronic counter 6 during the recording. As indicated by the dashed line 21, this third blocking device 20 is actuable together with the initiation of the control device and/or of the magnetic tape unit, by the crank handle 4 of the printer 3 of the volumeter 2.

A main switch 22 is connected in front of the entire system, and furthermore, optical and/or acoustical signaling devices are associated with the individual components to indicate the respectively ambient operating condition. Thus, a lamp 23, which is green, for example, is associated with the input unit 15. This lamp is lit up after the date and vehicle number have been put in and recorded. The device is switched on by main switch 22. Furthermore, the control unit 7 is associated with a blinker lamp 25, which flashes low intensity red, for example, when the apparatus is ready for counting, but the supplier's number has not yet been put in, and lights up continuously after the supplier's number has been fed. Finally, a yellow lamp 26 is associated with the magnetic tape unit 8, and this lamp lights up when the tape drive motor emits a counter voltage and/or when the recording current flows.

It is also possible to provide acoustic signal generators, such as, for example, a horn 27 which sounds when the constant values have not been put in, or when they have been put in only incompletely.

Figure 3:
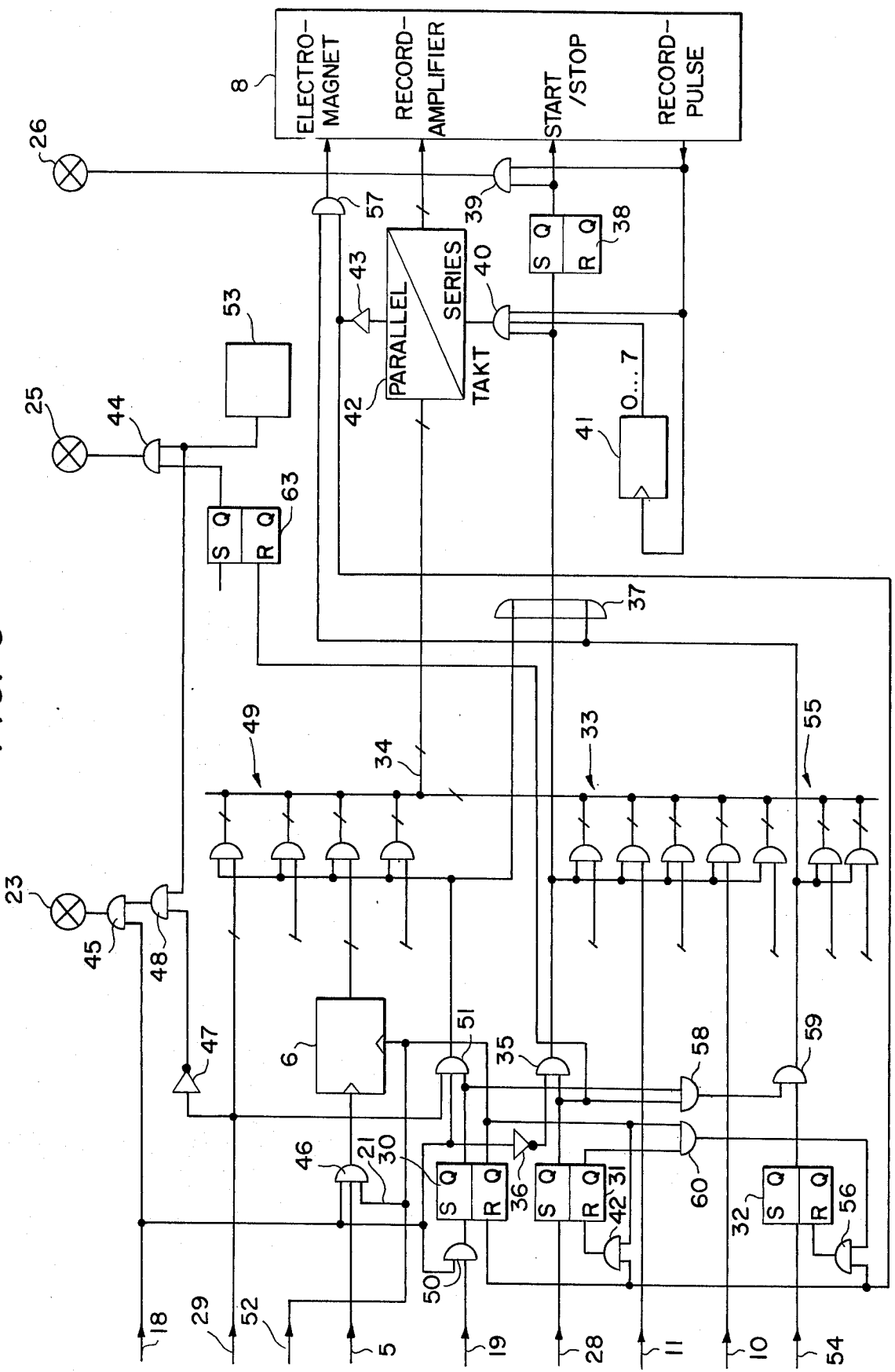
FIG. 3 is a circuit diagram showing the control device 7 of FIGS. 1 and 2.

Reference is made to FIG. 3 for a description of the circuit used in the control device 7. Data passes through the leads from coding switches 10 and 11 to the selection gates 33, to which are also applied permanently wired characters (a total of 10 characters + 40 bits). After the command "record date" has been issued by pressure on switch 28, flip-flop 31 is set on HI and the data is passed via selection gates 33 to the data collecting bar 34. This occurs only when the pump is switched off, that is, when gate 35 is kept open via inverter 36. The signal from gate 35 passes through the OR gate 37 to flip-flop 38, setting the latter on HI so that a starting signal is imparted to the motor of the mechanism and gates 39 and 40 are opened. The moment the mechanism is operating, it emits the WRITE trigger. The latter causes the display RECORD via gate 39 and is counted in counter 41. Output HI is open during triggers O . . . 7, that is, for eight triggers from gate 40, so that 8 bits from the data of the parallel series converter 42 arrives at the write-amplifier of the tape mechanism and on the tape. The parity bit and the character gap are written during the three blocking triggers (9, 10, 11). The moment the last bit is clocked out in this manner, output 43 of converter 42 is at HI and resets flip-flop 38, so that the mechanism stops. Simultaneously, pulse 43 passes via gate 42 and resets command memory flip-flop 31.

Upon switching the apparatus on, the READY FOR OPERATION control lamp 25 blinks because flip-flop 63 was set to HI by the setting pulse. Only when switch 28 is actuated is flip-flop 63 reset by means of flip-flop 31 and only then is the lamp controlled to light permanently by means of the LO input at NAND gate 44.

The mode of the operation of the above-described system is as follows:

At the beginning of a measuring operation, the main switch 22 is, first of all, closed. Thereafter, the date and the vehicle and/or measuring point numbers are fed manually by means of the coding switches 10 and 11, and the date pushbutton 28 is switched on. During the actuation of the date pushbutton 28, the date and the vehicle number and/or measuring point number are recorded by means of the magnetic tape unit 8. After the recording step is terminated, the green lamp 23 lights up and indicates that the device is ready for the subsequently following measurements of the amounts loaded or discharged. Simultaneously, the pump 17 is released via line 16, which pump can now be turned on, if required.

For the measurement proper, the supplier's number is fed, by means of the keyboard 12, to an intermediate storage unit, which latter is not shown. This input procedure is effected either prior to or during the measuring step. In order to erase a supplier's number which was inadvertently keyed in erroneously, a separate erasing button is provided. In case the supplier's number was not put in, the actuation of the control device 7 and thus of the magnetic tape unit 8 is prevented via the connection line 29 to the control device 7.

Before the supplier's number has been fed, the control lamp 25 is furthermore flashing and indicates optically that the supplier's number still must be put in. After the supplier's number has been fed, the control lamp 25 is lit continuously and this indicates that the supplier's number has now been fed.

For the purpose of effecting the counting operation, the device is switched on either prior to or during the feeding of the supplier's number, and this takes place in the illustrated embodiment by turning on the pump 17. This can also be accomplished by means of a separate pushbutton at the operating module. After the quantity to be measured has passed through the pipeline 1 and has been correspondingly counted, the counting step is terminated, and now the counted values are recorded on the tape. This is done by operating the crank handle 4 at the printer 3 of the volumeter 2, whereby, on the one hand, the magnetic tape unit 8 is set into operation by way of the control device 7, the control lamp 26 of this unit now being lit up, and whereby, on the other hand, the blocking device 20 is energized via the line 21. This blocking device now prevents the feeding of further pulses to the electronic counter 6. In place of the crank handle 4, it is also possible in this instance to provide a separate pushbutton at the operating module.

After the recording step is terminated, the apparatus is automatically shut off and remains in the position wherein it is ready for operation. Thereafter, the subsequent measurement is executed starting with the input of a new supplier's number, or the like.

Milk quantities and supplier numbers are recorded as follows:

It is assumed the pump is switched on. This is announced by signal 18 and thereby the READY FOR COUNT green lamp 23 and the pulse counter 6 are triggered via gates 45 and 46 respectively, while the data is blocked by means of inverter 36 and gate 35. As long as no supplier numbers are fed via 29, inverter 47 and NAND gate 48 provide blinking trigger 53 to the READY FOR COUNT lamp, so that the latter blinks until the supplier number has been keyed in. The supplier number, the output of pulse counter 6 and two permanent characters arrive at a second set of selection gates 49. The command RECORD QUANTITY 19 sets command flip-flop 30 only when the pump is switched on and it passes through gate 50. If, furthermore, the supplier number is provided, then it arrives via gate 51 to selection gates 49. Thereby the data of quantity and supplier number are applied to the data bus line 34. Also, by means of OR gate 37 and flip-flop 38, the mechanism is set in motion. Recording occurs as above. At the end of the recording, the LAST BIT pulse 43 resets flip-flop 30, whereupon counter 6 and supplier numbers are erased via 52. The quantity pulse counter 6 is blocked with respect to pulses by means of 30, 21 and gate 46.

The cassette is removed as follows:

An END OF DATA mark (EOM) is recorded at the end of the cassette and prior to removal. Flip-flop 32 is set to that end by key signal 54, so that the set of selection gates 55 is controlled by means of the output signal and via gate 59, so that the data (10 permanent characters) arrive at busline 34 so that the mechanism is started via OR gate 37 and flip-flop 38. Upon termination of the recording cycle, pulse 43 (LAST BIT) resets command memory flip-flop 32 via gate 56, however, this pulse previously has reached the electromagnet via gate 57 (that is, only if the cassette removal cycle has been selected) in the mechanism, this magnet then unlocks the cassette for its removal.

Gates 42, 56 and 60 are used to erase memory flip-flops 30, 31, 32 in consecutive manner when several cycles are selected and the particular cycle is terminated. Gates 35, 58 and 59 determine the priority of the recordings; quantity prior to date, date prior to EOM.

We claim:

1. An apparatus for flow-metering and recording amounts of liquid, particularly milk, provided with a volumetric meter comprising:
   a. a pulse generator (5) generating pulses which are a function of the flow rate;
   b. an electronic counter (6) connected to said pulse generator and receiving said pulses which are a function of the flow rate;
   c. a shift register (13) connected to the output of said electronic counter;
   d. a control apparatus (7) connected to the output of said shift register;
   e. a keyboard (12) for the input of given data entries connected to an input of said shift register;
   f. at least one coding switch (10, 11) for the input of further given data entries connected to said control apparatus;
   g. a magnetic tape unit (8) connected to the output of said control apparatus for storing the output values of said electronic counter, said data recorded by said magnetic tape unit for further processing in a data processing system; and
   h. a blocking device (15) connected to said at least one coding switch actuating means for initiating flow metering after input and recording of said given data entries assigned to said at least one coding switch.

2. Apparatus as defined in claim 1, wherein said blocking device (15) of said coding switch (10, 11) releases a first starting switch of a pump (17) mounted in flow line (1) and a second starting switch of said control apparatus (7) following recording of said given data entries for the purpose of pulse counting.

3. Apparatus as defined in claim 1, wherein said blocking device (15) of said coding switch (10, 11) has means for releasing a starting switch of said control apparatus (7) following recording of said given data entries for the purpose of pulse counting.

4. Apparatus as defined in claim 2, wherein said pump (17) and said control apparatus (7) are actuated simultaneously.

5. Apparatus as defined in claim 4, wherein said control apparatus comprises a second blocking apparatus connected to said keyboard (12) for the input of a supplier number and blocks counting and magnetic tape recording when there is no supplier number.

6. Apparatus as defined in claim 5, wherein said control apparatus (7) and said magnetic tape unit (8) is actuated by handcrank (4) of a printer (3) of a volumetric meter (2) by means of an associated contact for the purpose of recording said given data entries.

7. Apparatus as defined in claim 5, wherein a third blocking apparatus (20) is inserted between said pulse generator (5) of said volumetric meter (2) and said electronic counter (6), for interrrupting the pulse input to said electronic counter (6) during recording.

8. Apparatus as defined in claim 7, wherein said third blocking apparatus (20) is actuated in common with the activation of the control apparatus and said magnetic tape unit (8).

9. Apparatus as defined in claim 8, wherein signal generators (23, 24, 25, 26, 27) are associated with individual components (15, 7, 8, 22) for the purpose of displaying the particular operational state.

10. Apparatus as defined in claim 9, wherein said signal generator is a blinker light (25) for displaying the "ready-to-count" condition, said light blinking in the absence of supplier number input and lighting continuously after such input.

11. Apparatus as defined in claim 9, wherein said signal generator displaying the "ready-to-count" condition is a horn (27) which sounds in the absence and presence of said given data entries.

12. Apparatus as defined in claim 11, wherein said magnetic tape unit (8) is provided with interchangeable cassettes.

* * * * *